(12) United States Patent  
Tsai

(10) Patent No.: US 9,596,658 B2
(45) Date of Patent: Mar. 14, 2017

(54) POWER CONTROL METHODS

(71) Applicant: MediaTek Inc., Hsin-Chu (TW)

(72) Inventor: Jeng-Yi Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 393 days.

(21) Appl. No.: 13/804,143

(22) Filed: Mar. 14, 2013

(65) Prior Publication Data

US 2013/0322332 A1 Dec. 5, 2013

Related U.S. Application Data

(60) Provisional application No. 61/653,602, filed on May 31, 2012.

(51) Int. Cl.
*H04B 7/005* (2006.01)
*H04W 52/24* (2009.01)
*H04W 52/58* (2009.01)
*H04W 52/08* (2009.01)

(52) U.S. Cl.
CPC ......... *H04W 52/241* (2013.01); *H04W 52/58* (2013.01); *H04W 52/08* (2013.01)

(58) Field of Classification Search
USPC .................................................. 370/310–350
See application file for complete search history.

(56) References Cited

U.S. PATENT DOCUMENTS

| 6,873,857 | B1* | 3/2005 | Kanemoto et al. ........... 455/522 |
| 2003/0072274 | A1 | 4/2003 | Futakata et al. |
| 2005/0152279 | A1* | 7/2005 | Robertson et al. ........... 370/252 |
| 2006/0003787 | A1* | 1/2006 | Heo ..................... H04W 52/146 |
| | | | 455/522 |
| 2007/0060189 | A1* | 3/2007 | Vallette ................. H04W 52/12 |
| | | | 455/522 |
| 2009/0129305 | A1* | 5/2009 | Malkamaki .................. 370/311 |
| 2009/0305712 | A1* | 12/2009 | Franceschini ......... H04W 52/08 |
| | | | 455/450 |
| 2010/0246516 | A1* | 9/2010 | Pelletier ............... H04B 7/0404 |
| | | | 370/329 |
| 2010/0254292 | A1* | 10/2010 | Kim .................... H04W 52/343 |
| | | | 370/311 |
| 2011/0158205 | A1* | 6/2011 | Niemasz et al. .............. 370/336 |
| 2012/0281675 | A1* | 11/2012 | Liang .................... H04L 1/1854 |
| | | | 370/331 |

FOREIGN PATENT DOCUMENTS

| CN | 1413042 A | 4/2003 |
| CN | 102006657 A | 4/2011 |

* cited by examiner

Primary Examiner — Kwang B Yao
Assistant Examiner — Juvena Loo
(74) Attorney, Agent, or Firm — McClure, Qualey & Rodack, LLP

(57) ABSTRACT

Power control methods are provided. The power control method, performed by a receiving end device, includes receiving two consecutive slots from a dedicated physical channel (DPCH), determining a transmit power control command based on signal qualities of the two consecutive slots; and transmitting the transmit power control command in only a first transmit power control field that is firstly available after the transmit power control command is determined.

17 Claims, 7 Drawing Sheets

POWER CONTROL METHODS

CROSS REFERENCE TO RELATED APPLICATIONS

This Application claims priority of U.S. Provisional Application No. 61/653,602, filed on May 31, 2012, and the entirety of which is incorporated by reference herein.

BACKGROUND OF THE INVENTION

Field of the Invention

The present invention relates to mobile communications, and in particular, power control methods for Universal Mobile Telecommunications Systems (UMTS) Frequency-Division Duplexing (FDD) mobile communications systems.

Description of the Related Art

Power control is a critical function in CDMA-based systems. It is also a function that couples the system level performance with the radio link level performance. In consequence, the minimization of the transmit powers results in reduced interference, which in turn translates into increased system capacity.

BRIEF SUMMARY OF THE INVENTION

A detailed description is given in the following embodiments with reference to the accompanying drawings.

An embodiment of a power control method performed by a receiving end device is described, comprising: receiving two consecutive receive slots from a first dedicated physical channel (DPCH); determining a transmit power control command based on signal qualities of the two consecutive receive slots; and transmitting the transmit power control command in only one first transmit power control field for two consecutive transmit slots on a second DPCH; wherein the first transmit power control field is a transmit power control field firstly available after the transmit power control command is determined; and the first and second DPCHs carry radio signals in opposite directions.

Another embodiment of a power control method performed by a transmitting end device is provided, comprising: transmitting two consecutive transmit slots on a first DPCH; with respect to the two consecutive transmit slots, decoding a transmit power control command from only one first transmit power control field for two consecutive receive slots on a second DPCH; and adapting a gain of the transmitting end device according to the transmit power control command; wherein the first and second DPCHs carry radio signals in opposite directions.

Another embodiment of a power control method performed by a receiving end device is described, comprising: receiving three consecutive receive slots from a first dedicated physical channel (DPCH); determining a transmit power control command based on signal qualities of the three consecutive receive slots; and transmitting the transmit power control command in only one first transmit power control field for three consecutive transmit slots on a second DPCH; wherein the first transmit power control field is a transmit power control field firstly available after the transmit power control command is determined; and the first and second DPCHs carry radio signals in opposite directions.

Another embodiment of a power control method performed by a transmitting end device is provided, comprising: transmitting three consecutive transmit slots on a first DPCH; with respect to the three consecutive transmit slots, decoding a transmit power control command from only one first transmit power control field for three consecutive receive slots on a second DPCH; and adapting a gain of the transmitting end device according to the transmit power control command; wherein the first and second DPCHs carry radio signals in opposite directions.

Another embodiment of a power control method performed by a UMTS FDD system is disclosed, wherein the UMTS FDD system includes a data transmitting end device and a data receiving end device, the power control method comprising: transmitting, by the transmitting end device, two consecutive transmit slots on a first DPCH; receiving, by the receiving end device, the two consecutive transmit slots from the first DPCH; determining, by the receiving end device, a transmit power control command based on signal qualities of the two transmit consecutive slots; and transmitting, by the receiving end device, the transmit power control command in only one transmit power control field for two consecutive receive slots on a second DPCH; wherein the first and second DPCHs carry radio signals in opposite directions.

BRIEF DESCRIPTION OF THE DROWINGS

The present invention is configured to be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Since 1999, 3rd Generation Partnership Project (3GPP) released several versions of spread-spectrum-based mobile communications system, including Universal Mobile Telecommunications Systems (UMTS), High-Speed Packet Access (HSPA), and High-Speed Packet Access+(HSPA+). The following discussions are based on UMTS Frequency-Division Duplexing (FDD) communications system, which is also called Release 99 FDD to discriminate from those new features in later releases. We will illustrate various features and benefits of the disclosed power control methods, devices and systems.

Power control (PC) in conventional UMTS FDD systems consist of an open loop PC, an inner loop PC (known as fast closed loop PC), and an outer loop PC. The open loop PC is responsible for setting the initial uplink and downlink transmit powers when user equipment (UE) is accessing the network. The inner loop power control adjusts the transmit power on a 1500 Hz basis to trace the target signal-to-interference-plus-noise ratio (SINR) specified by outer loop PC. The outer loop PC adjusts the target SINR to trace the target link block error rate (BLER) configured from Network.

Figure 1:
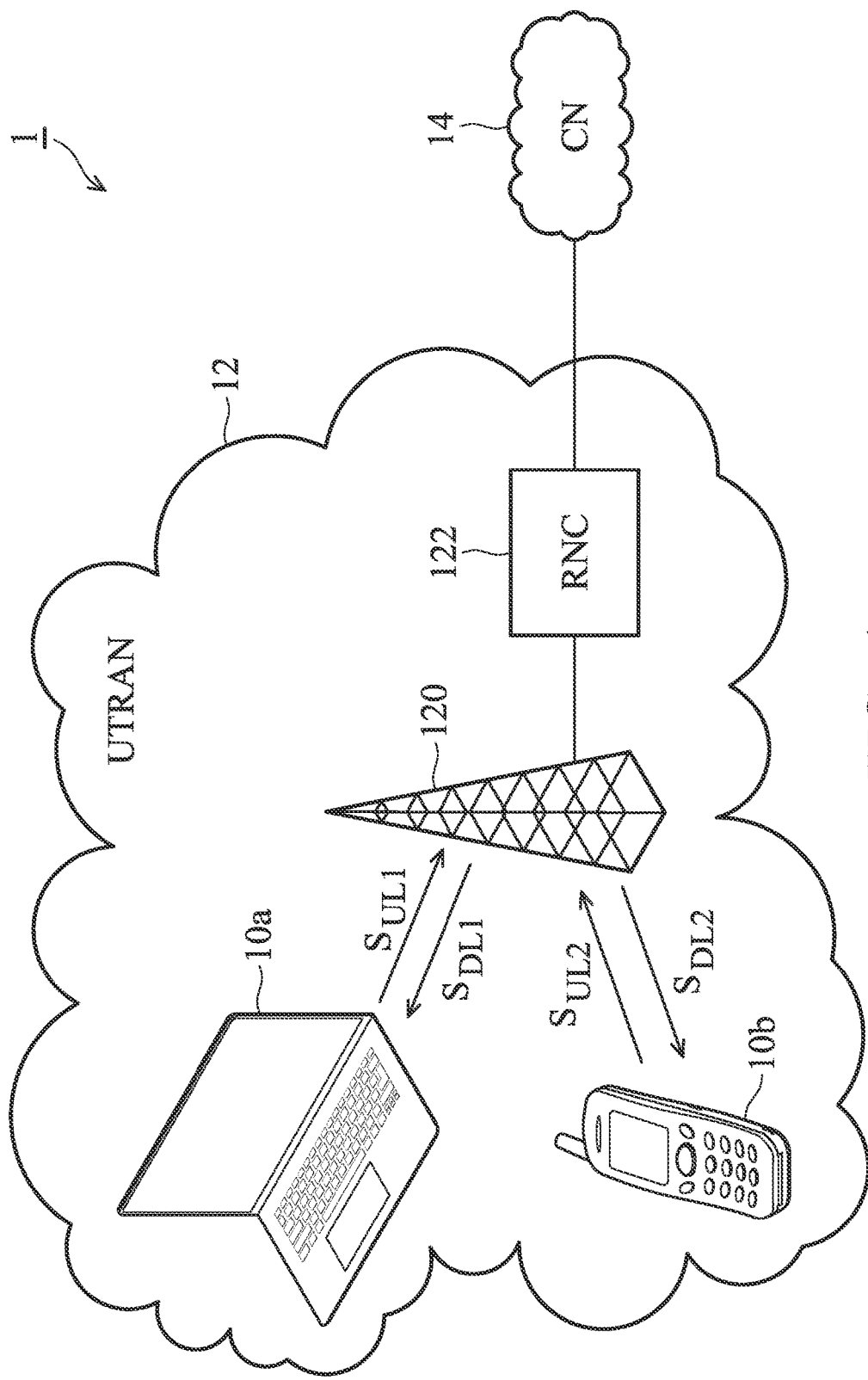
FIG. 1 is a system diagram of an UMTS FDD communications system according to an embodiment of the invention.

FIG. 1 is a system diagram of an UMTS FDD system 1 according to an embodiment of the invention, comprising a notebook computer with dongle 10a and a mobile phone 10b, a UMTS Terrestrial Radio Access Network (UTRAN) 12 which includes a Node B 120 and a radio network controller (RNC) 122, and a core network (CN) 14. The notebook computer with dongle 10a and the mobile phone 10b are User Equipments (UEs) which is configured to acquire services from the UMTS FDD system 1 via communications with the Node B 120. Specifically, the communications between the Node B 120 and the UEs 10a, 10b include uplink DPCHs $S_{UL1}$, $S_{UL2}$ and a downlink DPCHs $S_{DL1}$, $S_{DL2}$. The RNC 120, connected between the Node B 120 and the CN 14, carries out radio resource management and certain mobility management for a connected UE.

The UMTS FDD system 1 employs a transmit power control (TPC) mechanism in both uplink and downlink direction. All Node Bs and User Equipments contain a transmitter, a receiver, and a controller (not shown). Once the dedicated link has been established, the transmitter is configured to transmit a series of radio frames which contain 15 time slots over a period of 10 ms on a Dedicated Physical Channel (DPCH), while the receiver is configured to reciprocally receive radio frames from the DPCH. The DPCH includes one or multiple downlink DPCHs and an uplink DPCH.

To minimize the interference from other UEs, the uplink power control try to minimize the uplink DPCH transmit powers observed at the Node B 120, while meeting specified target block error rates (BLER) for all links respectively. In the uplink power control, the notebook computer with dongle 10a or the mobile phone 10b serves as a data transmitting end (transmitting end device) which alters a gain of a transmitter thereof, and the Node B 120 serves as a data receiving end (receiving end device) which determines and sends a TPC command based on signal qualities of received uplink DPCHs to control the uplink transmit power. The Node B 120 determines a TPC command based on signal quality of a received uplink DPCH $S_{UL1}$ and sends the TPC command on the downlink DPCH $S_{DL1}$, and the UE 10a receives the TPC command from the downlink DPCH $S_{DL1}$, which alters a gain of a transmitter of the UE 10a. In the same way, the Node B 120 determines a TPC command based on signal qualities of a received uplink DPCH $S_{UL2}$ and sends the TPC command on the downlink DPCH $S_{DL2}$, and the UE 10b receives the TPC command from the downlink DPCH $S_{DL2}$, which alters a gain of a transmitter of the UE 10b.

To minimize the interference to other UEs, the downlink power control try to minimize the downlink DPCH transmit powers observed at the UE 10a and 10b, while meeting specified target BLERs for all links respectively. In the downlink power control, the Node B 120 serves as a data transmitting end (transmitting end device) which alters a gain of a transmitter thereof, the notebook computer with dongle 10a or the mobile phone 10b servers as a data receiving end (receiving end device) which determines and sends a TPC command based on signal qualities of received downlink DPCHs to control the downlink transmit power. The UE 10a determines a TPC command based on signal quality of received downlink DPCH $S_{DL1}$ and sends the TPC command on the uplink DPCH $S_{UL1}$, and the Node B 120 receives the TPC command from the uplink DPCH $S_{UL1}$, which alters a gain on UE 10a of a transmitter of the Node B 120. In the same way, the UE 10b determines a TPC command based on signal quality of received downlink DPCH $S_{DL2}$ and sends the TPC command on the uplink DPCH $S_{UL2}$, and the Node B 120 receives the TPC command from the uplink DPCH $S_{UL2}$, which alters a gain of a transmitter of the Node B 120.

The system capacity of the Node B 120 is limited by the downlink power shared by all served UEs and the interference from other Node Bs' (not shown) downlink transmission. Thus, the system capacity of the Node B 120 can be optimized by reducing the required downlink transmit power since the saved power may be allocated to more UEs. Meanwhile, other Node Bs also reduced the required downlink transmit power, therefore the interference from other Node Bs is reduced and the system capacity is again improved. Various embodiments shown in FIG. 2 through FIG. 7 is configured to incorporate the UMTS FDD system 1 in the uplink or downlink direction to reduce the interference and increase the system capacity by reducing the frequency of sending the TPC command at the data receiving end, and in turn, reducing the frequency of receiving and decoding the TPC command at the data transmitting end. In this way, the frequency of transmitting the TPC command is reduced to below the conventional 1500 Hz. In the embodiments, the frequency of transmitting of the TPC command is reduced down to 750 Hz, or even 500 Hz, resulting in a reduction in the transmit power and the interference, and an increase in the system capacity. Details of the power control methods are provided in ways of embodiments in FIG. 2 through FIG. 7 as follows.

Figure 2:
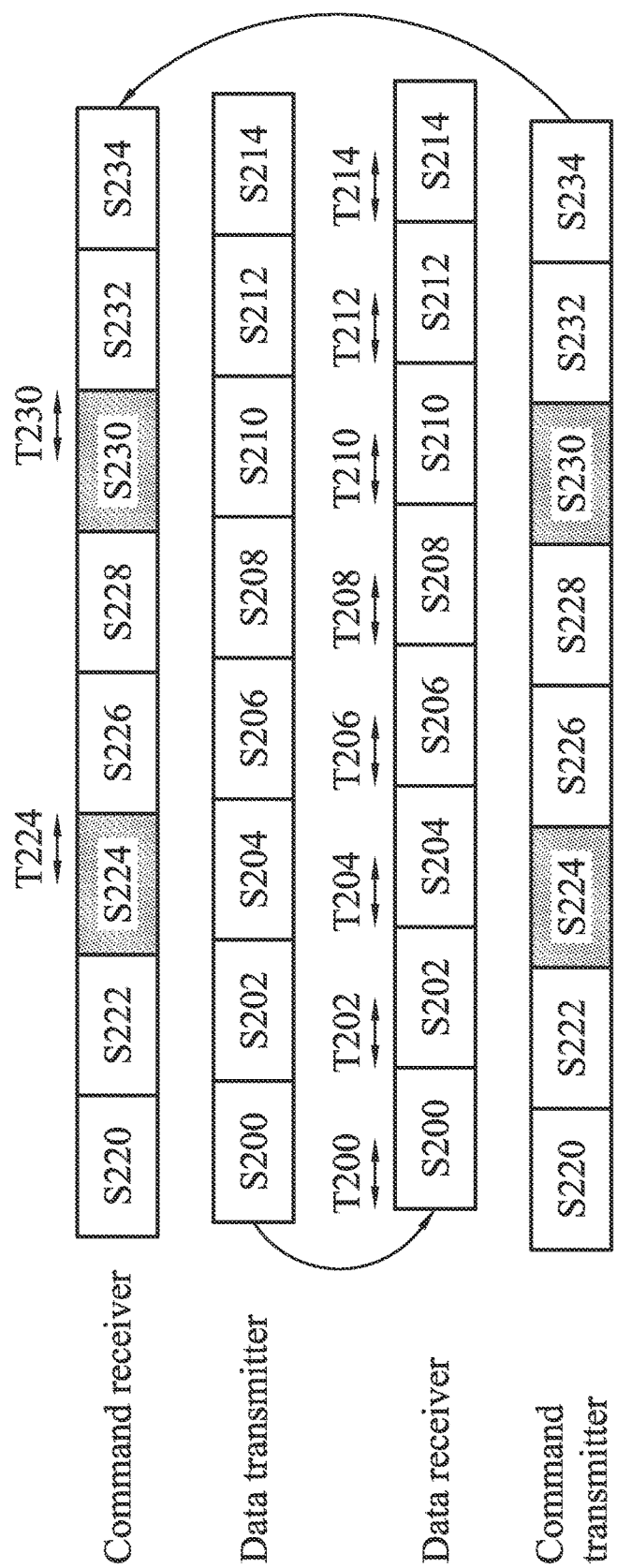
FIG. 2 illustrates radio frames communicated in a power control method according to an embodiment of the invention. (Descriptions in top-down order shall be slot timing of command receiver, slot timing of data transmitter, slot timing of data receiver and slot timing of command transmitter)

FIG. 2 illustrates radio frames communicated in a power control method according to an embodiment of the invention, incorporating the UMTS FDD system 1 in FIG. 1. FIG. 2 shows 4 radio frames depicted in an order of time from the left to the right. The top two radio frames correspond to the radio frames seen by the command receiver and the data transmitter both located at the data transmitting end, the bottom two radio frames correspond to the radio frames seen by the data receiver and the command transmitter both located at the data receiving end. Each radio frame show 8 time slots (slots), however, it should be understood by people skilled in the art that each radio frame contains 15 time slots.

The power control method shows a transmit power control rate of 500 Hz, the TPC command is transmitted only once per 3 time slots. In certain embodiments, the TPC fields of unshadowed slots S220, S222, S226, S228, S232 and S234 may be left in blank and bear no information or data in them. In other embodiments, the TPC fields of unshadowed slots S220, S222, S226, S228, S232 and S234 may carry information or data other than TPC.

Upon startup, the data transmitter transmits slots S200 through S214. Correspondingly, the data receiver receives the slots S200 through S214 and computes corresponding signal qualities for the received slots S200 through S214 at durations T200 though T214. During the duration T200 though T214, the data receiver correspondingly extracts the pilot symbols from the received slots S200 through S214 and computes the corresponding signal qualities. For each group of 3 consecutive slots, the controller of the data receiving end determines one TPC command which is included into the next immediately available TPC field in the slot, or the shadowed slots S224 and S230. For example, the TPC command for the group of the slots S200, S202 and S204 is included into the next immediately available TPC field of the slot S224, and the TPC command for the group of the slots S206, S208 and S210 is included into the next immediately available TPC field of the slot S230. For each group of 3 consecutive slots, the TPC command is only sent once by the command transmitter. As a result, only one TPC command is received and decoded for each group of 3 consecutive slots by the command receiver at durations T224 and T230. For each group of 3 consecutive slots transmitted by the command transmitter, the two TPC fields other than the one containing the TPC command may be left blank in the case of the uplink power control. For example, the slots 226 and 228 may be left blank without carrying any data for the uplink power control. For the downlink power control, however, the specification does not allow a blank TPC field in the uplink slot, the UE is configured to fill in the unused TPC field with other control information, as detailed by the embodiment in FIG. 3. During the durations T224 and T230, the command receiver decodes the TPC command and make appropriate adjustment to the gain or the transmit power of the data transmitter according to the decoded TPC command. The data transmitter changes the gain or the transmit power of the transmitter thereof as soon as one TPC command being decoded, i.e., right after the durations T224 and T230.

Figure 3:
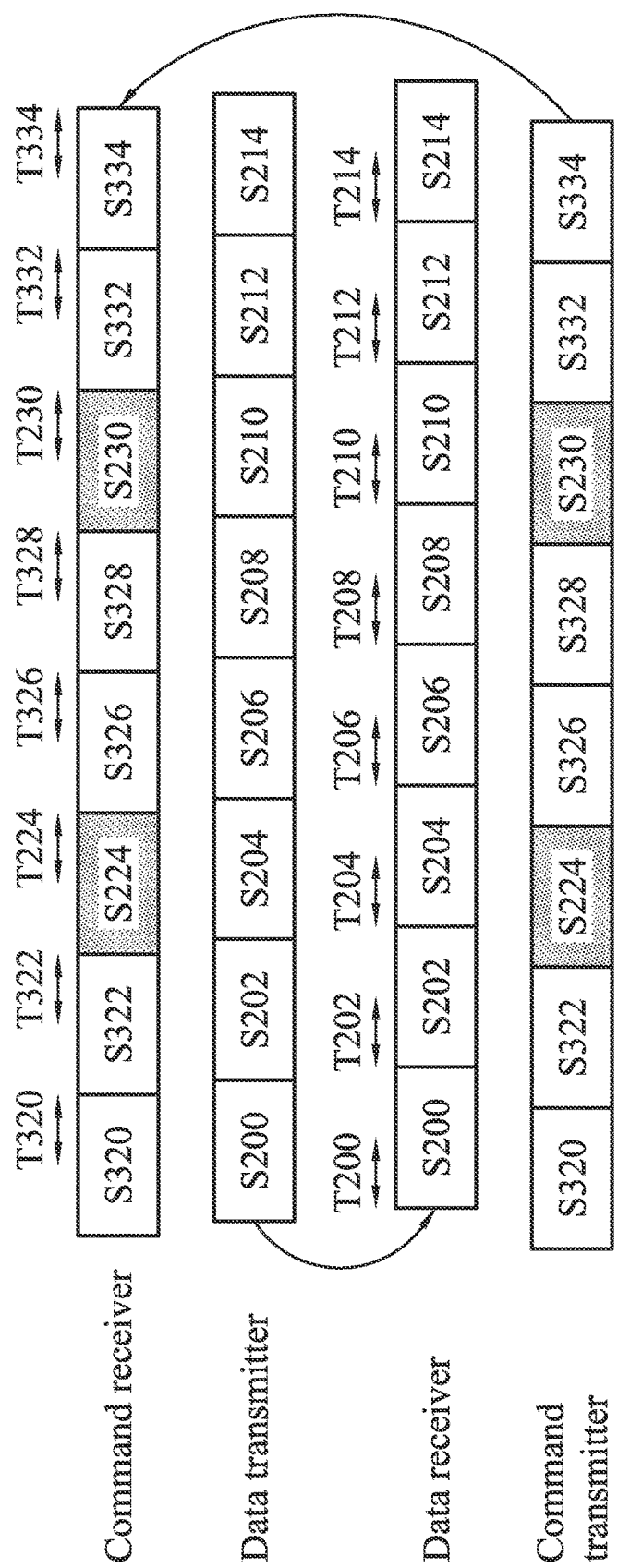
FIG. 3 illustrates radio frames communicated in a power control method according to another embodiment of the invention.

FIG. 3 illustrates radio frames communicated in a power control method according to another embodiment of the invention, incorporating the UMTS FDD system 1 in FIG. 1. FIG. 3 is similar to FIG. 2, and is distinct from FIG. 2 in that the TPC fields of unshadowed slots S320, S322, S326, S328, S332 and S334 are reserved for transmitting information other than the TPC command. More specifically, the power control method in FIG. 3 shows a transmit power control rate of 500 Hz, the TPC command is transmitted only once per 3 time slots, with the other 2 TPC fields of the other 2 time slots containing data or layer 1 control information such as pilots, feedback signal or indicators in them. The indicators may be information of acknowledgment (ACK)/negative acknowledgment (NACK) etc. Since the unshadowed slots S320, S322, S326, S328, S332 and S334 also carry information in them, the transmitting end is configured to process the carried information in durations T320, T322, T326, T328, T332 and T334 accordingly.

Figure 4:
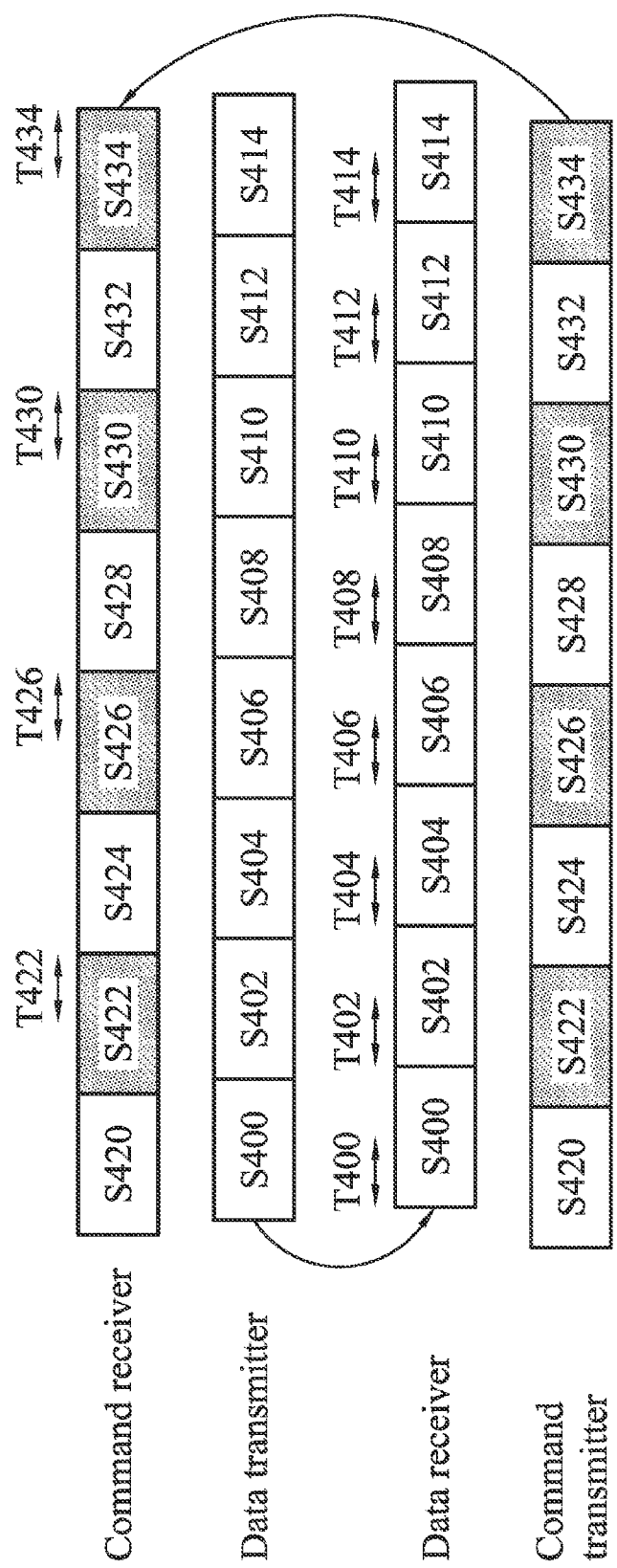
FIG. 4 illustrates radio frames communicated in a power control method according to yet another embodiment of the invention.

FIG. 4 illustrates radio frames communicated in a power control method according to yet another embodiment of the invention, incorporating the UMTS FDD system 1 in FIG. 1. The power control method in FIG. 4 shows a transmit power control rate of 750 Hz, the TPC command is transmitted only once every 2 time slots, and the spare TPC field of the 2 time slots may be reserved for other non-TPC command information or data.

FIG. 4 is distinct from FIG. 2 in that the time slots S400 through S414 are grouped into 2 for determining a TPC command at the data receiving end. Correspondingly, the data receiver is configured to extract and process the pilot symbols to compute corresponding signal qualities at durations T400 through T414. For each group of 2 consecutive slots, the controller of the data receiving end is configured to determine one TPC command to be included into the next immediately available TPC field in the slot, or the shadowed slots S422, S426, S430 and S434. For example, the TPC command for the group of the slots S400 and S402 is included into the next immediately available TPC field of the slot S422, and the TPC command for the group of the slots S404 and S406 is included into the next immediately available TPC field of the slot S426. For each group of 2 consecutive slots, the TPC command is only sent once by the command transmitter at the data receiving end. As a result, only one TPC command is received and decoded for each group of 2 consecutive slots by the command receiver at the data transmitting end at durations T422, T426, T430 and T434. During the durations T422, T426, T430 and T434, the command receiver at the data transmitting end is configured to decode the TPC command and make appropriate adjustment to the gain or the transmit power of the data transmitter at the data transmitting end according to the decoded TPC command. The data transmitting end is configured to change the gain or the transmit power of the data transmitter thereof as soon as one TPC command being decoded, i.e., right after the durations T422, T426, T430 and T434. In certain embodiments, the TPC fields of unshadowed slots S420, S424, S428, and S432 may be left in blank and bear no information or data in them. In other embodiments, the TPC fields of unshadowed slots S420, S424, S428, and S432 may carry indication information for indication channels such as the ACK/NACK channel or the RACH. Accordingly, the data transmitting end is configured to process the carried indication information upon the data retrieval.

It should be noted that although in the embodiments of FIG. 2 through FIG. 4, the TPC command is inserted in the TPC field immediate after being calculated, it is equally applicable to include the TPC command in any one of the TPC fields in the group of consecutive transmit slots being sent. So long as the TPC command is sent by only one of the TPC fields for every group of the consecutive transmit slots, the power control method may be adapted to meet different design preferences without exceeding the scope of the invention.

Further, it should also be noted that although in the embodiments, the data transmitting end adapts the gain of the data transmitter at timing immediately after the TPC command is decoded, the data transmitting end can carry out the gain adaptation until the next or later gain adaptation cycle.

The power control methods in FIG. 2-FIG. 4 illustrate various embodiments which send the TPC command only once for every group of consecutive slots, thereby reducing the transmitted transmit power at the data transmitting end, decreasing the interference with or from other data transmitting ends, and improving the system capacity.

Figure 5:
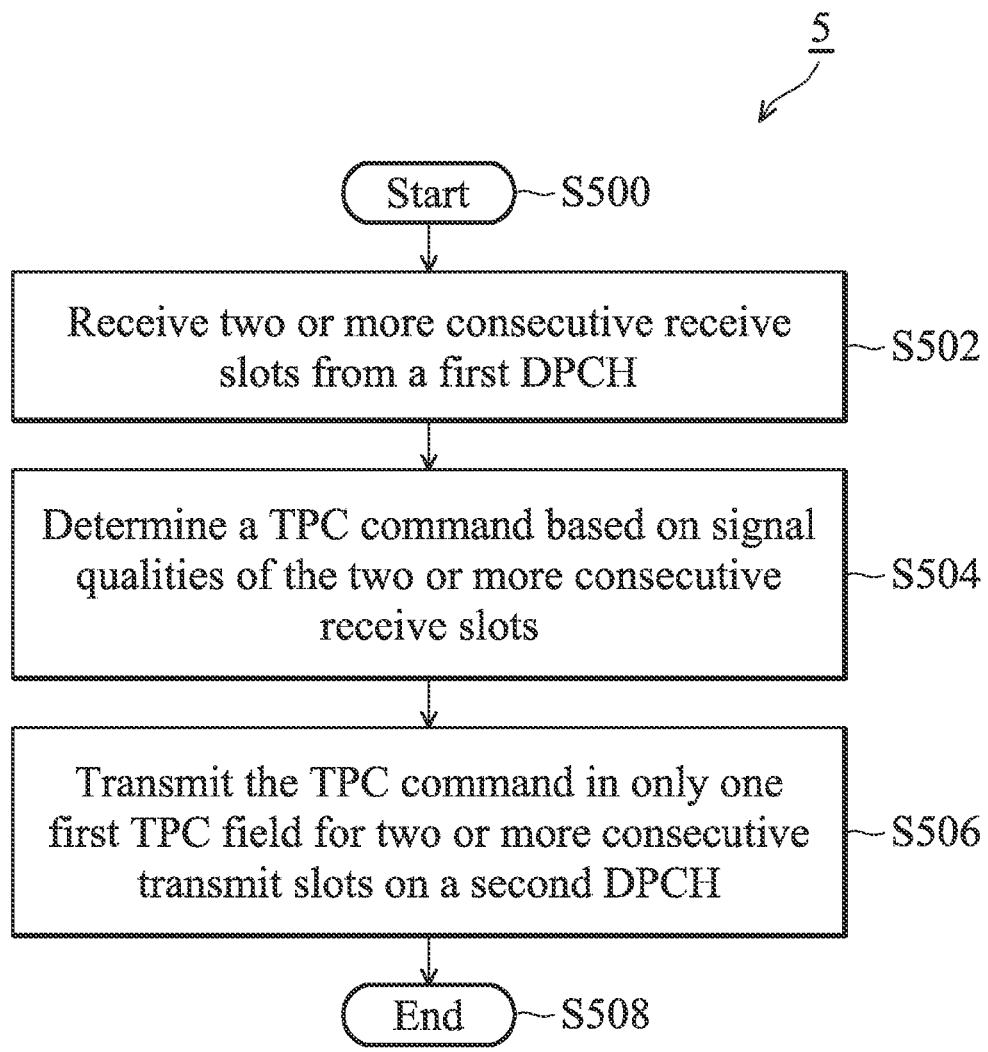
FIG. 5 is a flowchart of a power control method according to an embodiment of the invention.

FIG. 5 is a flowchart of a power control method 5 according to an embodiment of the invention, incorporating the data receiving end of the UMTS FDD system 1 in FIG. 1. The power control method 5 may be adopted by the UE, the Node B 120, or both.

Upon startup, the command transmitter, the data receiver and the controller at the data receiving end are initialized, ready to detect a radio frame from the DPCH (S500). Next, the data receiver at the data receiving end is configured to receive two or more consecutive receive slots in the received radio frame from the DPCH (S502). In response, the controller of the data receiving end is configured to determine corresponding signal qualities for the two or more consecutive receive slots. Since each radio frame contains 15 slots, when receiving a group of two consecutive receive slots, there will be a group of 2 slots occupying 2 successive frames. Consequently, the last time slot of a present received radio frame may have to be paired with the first time slot of the next received radio frame. The data receiving end is configured to keep track of the connection frame number (CFN) which specifies a count for a radio frame. Further, the data receiving end is configured to group all receive slots in the received radio frame by 2 slots in a consecutive manner. When the connection frame number of the received radio frame is even, the data receiving end is configured to make sure the first slot of the first 2-slot group aligns with a boundary of the received radio frame, and when the connection frame number of the received radio frame is odd, the data receiving end is configured to confirm that a very beginning group of two consecutive receive slots is across a boundary of two received radio frames. In certain embodiments, the data receiving end is configured to start the grouping of the slots from a radio frame with an odd CFN. In that case, when the CFN of the radio frame is odd, the data receiving end is configured to ensure the first slot of the first 2-slot group aligns with a boundary of the received radio frame, and when the CFN of the received radio frame is even, the data receiving end is configured to check that a very beginning group of two consecutive receive slots is across a boundary of two received radio frames. When receiving a group of three consecutive receive slots, the data receiving end is configured to group all receive slots in the received radio frame by 3 slots in a consecutive manner. In this way, the data receiving end is configured to group exactly 5 groups of 3-slot group for a radio frame.

The controller of the data receiving end is configured to compare each determined signal quality with a target signal quality to determine the TPC command (S504). The signal quality may be a signal-to-noise ratio or other parameters that measures the quality of the signal. When the determined signal quality exceeds the target signal quality, the controller is configured to set a TPC command to decrease the transmit power at the data transmitting end. On the contrary, when the determined signal quality is less than the target signal quality, the controller is configured to set a TPC command to increase the transmit power at the data transmitting end. When the determined signal quality is substantially the same as the target signal quality, the controller is configured to set a TPC command to retain the present transmit power level at the data transmitting end. In some embodiments, the controller is configured to apply weighting technique to the signal qualities in order to determine the TPC command. For example, the controller is configured to assign different weights to the signal qualities of the two or more consecutive receive slots, average the weighted signal qualities, and determine a required gain, a required transmit power, or a TPC command by the averaged and weighted signal quality. In other embodiments, the controller simply average the two or more signal qualities to determine the required gain, the required transmit power, or the TPC command that is configured to be used to control the transmit power of the received radio frame.

Once determining the TPC command, the command transmitter of the data receiving end is configured to transmit the TPC command in only one first TPC field for two or more consecutive transmit slots on another DPCH (S506). In some embodiments, the command transmitter may transmit the TPC command for only once in the firstly available TPC field of the transmitted radio frame. In other embodiments, the command transmitter may transmit the TPC command for only once in any slot of the two or more consecutive transmit slots. For example, in the case of the downlink power control, the command transmitter can send the TPC command by only the first available TPC field and leave one or more TPC fields of the transmitted radio frame empty. In another example, the command transmitter is configured to send the TPC command by only the firstly available TPC field and send indication information not associated with the TPC in one or more TPC fields of the transmitted radio frame. The indication information may be signaling in an indication channel such as an ACK/NACK channel or a RACH. As this point, the power control method 5 has completed and exited (S508).

Power control method 5 transmits only one TPC command for the signal qualities taken from a group of two or more consecutive receive slots of the received radio frame, thereby reducing the transmitting transmit power at the data transmitting end, and improving the system capacity of the UMTS-FDD system.

Figure 6:
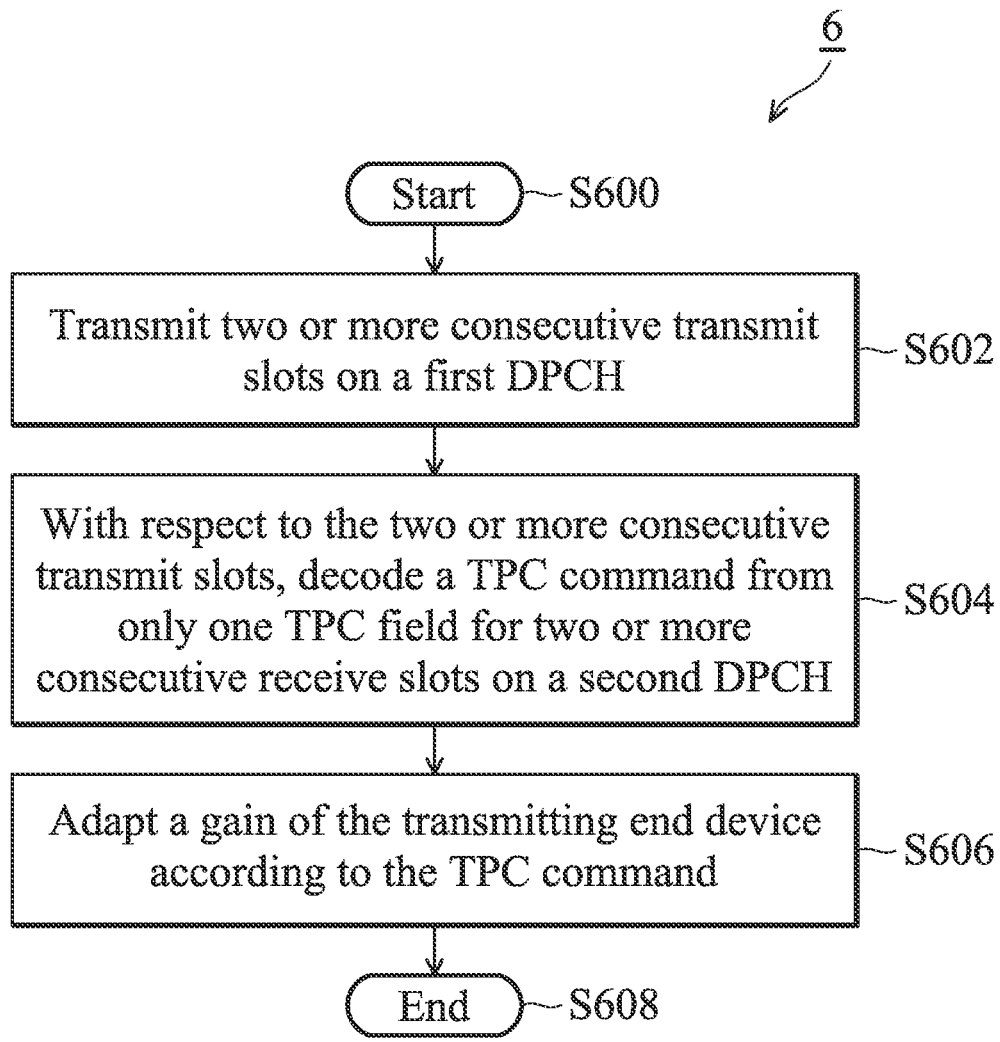
FIG. 6 is a flowchart of a power control method according to another embodiment of the invention.

FIG. 6 is a flowchart of a power control method 6 according to another embodiment of the invention, incorporating the data transmitting end of the UMTS FDD system 1 in FIG. 1. The power control method 6 may be adopted by the UE, the node B 120, or both.

Upon startup, the data transmitter, the command receiver and the controller of the data transmitting end are initialized, ready to transmit a radio frame over a first DPCH (S600). Next, the data transmitter of the data transmitting end is configured to transmit two or more consecutive transmit slots in a transmitted radio frame over the first DPCH (S602). The data transmitter may group all transmit slots in the transmitted radio frame by 2 or more slots as a transmitted slot group. In response, the command receiver of the data transmitting end is configured to expect a TPC command from a data receiving end for every two or more consecutive transmit slots being sent. Specifically, the command receiver can receive and group all receive slots in the received radio frame by 2 or more slots with a number of grouped slots being identical to that of the transmit slot group. Since each radio frame contains 15 slots, when grouping two consecutive receive slots for every TPC command expected, there will be a group of 2 slots occupying 2 successive frames. Consequently, the last time slot of a present received radio frame may have to be paired with the first time slot of the next received radio frame. As a result, the data transmitting end is configured to also keep track of the connection frame number. When the connection frame number of the received radio frame is even, the data transmitting end is configured to make sure the first slot of the two or more consecutive receive slots aligns with a boundary of the received radio frame, and when the connection frame number of the received radio frame is odd, the data transmitting end is configured to confirm that a group of two consecutive receive slots is across a boundary of two successive radio frames. In certain embodiments, the data transmitting end is configured to start the grouping of the receive slots from a radio frame with an odd CFN. In that case, when the CFN of the radio frame is odd, the data transmitting end is configured to ensure the first slot of the first 2-slot group aligns with a boundary of the received radio frame, and when the connection frame number of the received radio frame is even, the data transmitting end is configured to check that a very beginning group of two consecutive receive slots is across a boundary of two received radio frames. When transmitting a group of three consecutive slots, the data transmitting end is configured to group all receive slots in the received radio frame by 3 slots in a consecutive manner. In this way, the data transmitting end is configured to group exactly 5 groups of 3-slot group for each radio frame.

Accordingly, for every group of two or more consecutive slots sent, the command receiver of the data transmitting end is configured to receive and decode a TPC command from only one TPC field for two or more consecutive receive slots on a second DPCH (S604). In some embodiments, the command receiver may receive the TPC command for only once in the firstly available TPC field of the received radio frame. In other embodiments, the command receiver may receive the TPC command for only once in any slot of the 2 or more consecutive receive slots. For examples, the command receiver may receive the TPC command from only the first available TPC field, and further receive indication information not associated with the TPC in one or more TPC fields of the group of the consecutive slots being received. The indication information may be signaling in an indication channel such as an ACK/NACK channel or a RACH. In another example, in the case of the downlink power control, the command receiver may receive the TPC command by only the first available TPC field and leave one or more TPC fields of the transmitted radio frame empty.

The controller of the data transmitting end is configured to adapt the gain of the data transmitter of the data transmitting end according to the decoded TPC command (S606). Since the data transmitting end is required to decode only one TPC command, the gain of the data transmitter is configured to be updated soon after the first available TPC field is received and only once for every group of the consecutive transmit slots being sent. The timing for adapting the gain for the data transmitter is aligned with a time boundary of the next group of transmit slots. Then, the power control method 6 has completed and exited (S608).

Power control method 6 receives and decodes only one TPC command from a group of two or more receive consecutive slots of the transmitted radio frame, thereby reducing the power for receiving and decoding TPC command data at the data transmitting end and increasing the system capacity of the UMTS-FDD system.

Figure 7:
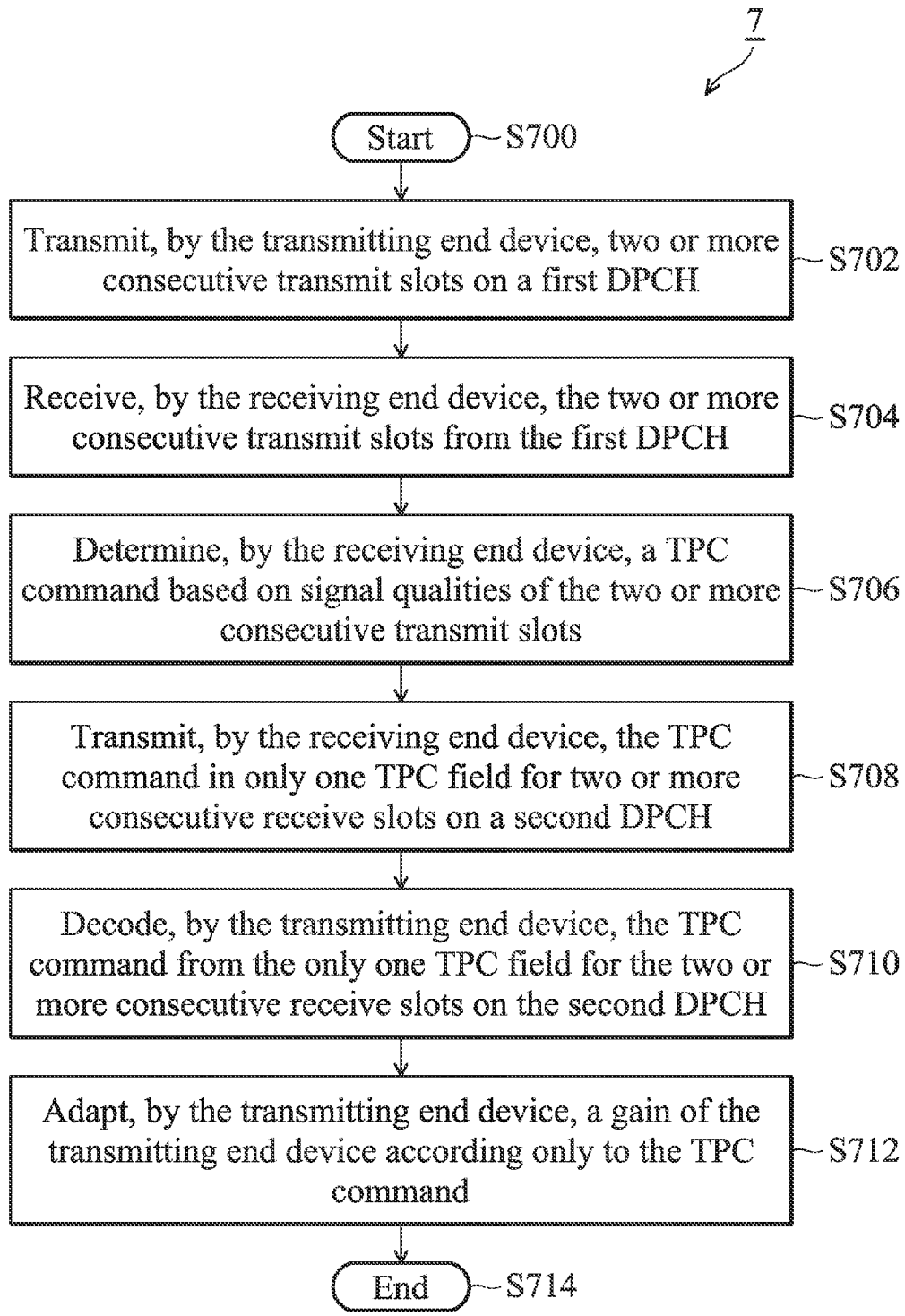
FIG. 7 is a flowchart of a power control method according to yet another embodiment of the invention.

FIG. 7 is a flowchart of a power control method 7 according to yet another embodiment of the invention, incorporating the data transmitting end and the data receiving end of the UMT system 1 in FIG. 1.

Upon startup, the data transmitting end and the data receiving end are initialized, ready to transmit a first radio frame over the DPCH (S700). Next, the data transmitter of the data transmitting end is configured to transmit two or more consecutive transmit slots in a first radio frame over the first DPCH (S702). Correspondingly, the data receiver of the data receiving end is configured to receive the two or more consecutive transmit slots in the first radio frame from the first DPCH (S704). In response, the controller of the data receiving end is configured to determine corresponding signal qualities for the two or more consecutive transmit slots. In the case of transmitting a TPC command for every 2 consecutive transmit slots, both the data transmitting end and the data receiving end is configured to keep track of the connection frame number. When the connection frame number of the first radio frame is even, both the data transmitting end and the data receiving end is configured to make sure the first slot of the two consecutive transmit slots aligns with a boundary of the first radio frame. When the connection frame number of the first radio frame is odd, both the data transmitting end and the data receiving end is configured to confirm that a group of two consecutive transmit slots is across a boundary of two radio frames. In the case of 3 consecutive transmit slots being grouped, the data transmitting end and data receiving end are configured to group all transmit slots in the radio frame by 3 slots in a consecutive manner. In this way, exactly 5 groups of 3-slot group will be grouped for each single radio frame.

The controller of the data receiving end is configured to compare each determined signal quality with a target signal quality to determine the TPC command (S706). When the determined signal quality exceeds the target signal quality, the controller is configured to set a TPC command to decrease the transmit power at the data transmitting end. On the contrary, when the determined signal quality is less than the target signal quality, the controller end is configured to set a TPC command to increase the transmit power at the data transmitting end. When the determined signal quality is substantially the same as the target signal quality, the controller is configured to set a TPC command to retain the present transmit power level at the data transmitting end. In some embodiments, the controller is configured to apply weighting technique to the signal qualities in order to determine the TPC command. For example, the controller is configured to assign different weights to the signal qualities of the two or more consecutive transmit slots, average the weighted signal qualities, and determine a required gain, a required transmit power, or a TPC command by the averaged and weighted signal quality. In other embodiments, the controller simply averages the two or more signal qualities to determine the required gain, the required transmit power, or the TPC command that is configured to be used to control the transmit power of the radio frame.

Upon determining the TPC command, the command transmitter of the data receiving end is configured to transmit the TPC command in only one TPC field for two or more consecutive receive slots on a second DPCH (S708). In some embodiments, the command transmitter may transmit the TPC command for only once in the firstly available TPC field of the transmitted radio frame. In other embodiments, the command transmitter may transmit the TPC command for only once in any slot of the two or more consecutive transmit slots. For example, the command transmitter of the data receiving end is configured to send the TPC command by only the first available TPC field and leave one or more TPC fields of each group of the sent consecutive receive slots empty. In another example, the command transmitter of the data receiving end is configured to send the TPC command by only the first available TPC field and send indication information not associated with the TPC in one or more TPC fields of each group of the sent consecutive receive slots. The group of the consecutive receive slots being sent has the same number of time slots as the group of the consecutive transmit slots being received in Step S702. The indication information may be signaling in an indication channel such as an ACK/NACK channel or a RACH.

Correspondingly, the command receiver of the data transmitting end is configured to receive and decode the TPC command from the only one TPC field for the two or more consecutive receive slots on the second DPCH (S710), and the controller of the data transmitting end is configured to adapt the gain of the data transmitter of the data transmitting end according to the decoded TPC command (S712). Lastly, the power control method 7 has completed and exited (S714).

Power control method 7 discloses a UMTS-FDD system which sends the TPC command only once for every group of consecutive transmit slots received, thereby reducing the received transmit power at the data receiving end, decreasing the interference with or from other data receiving ends, reducing the power for receiving and decoding TPC command data at the data transmitting end, and increasing the system capacity.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power control method performed by a receiving end device, comprising:
    receiving two consecutive receive slots from a first dedicated physical channel (DPCH);
    determining a transmit power control command based on signal qualities of the two consecutive receive slots; and
    transmitting the transmit power control command in only one first transmit power control field for two consecutive transmit slots on a second DPCH;
    wherein a second transmit power control field transmitted on the second DPCH is a transmit power control field carrying information or data other than the transmit power control command;
    wherein the first transmit power control field is a transmit power control field firstly available after the transmit power control command is determined; and
    the first and second DPCHs carry radio signals in opposite directions.

2. The power control method of claim 1, further comprising transmitting an information that is not associated with the transmit power command in the second transmit power control field.

3. The power control method of claim 1, wherein only when a connection frame number of the radio frame is even, a first slot of the two consecutive receive slots aligns with a boundary of the radio frame.

4. The power control method of claim 1, wherein determining step comprises:
    assigning different weights to the signal qualities of the two consecutive receive slots; and
    determining the transmit power control command based on the assigned weights and the signal qualities of the two consecutive receive slots.

5. A power control method performed by a transmitting end device, comprising:
    transmitting two consecutive transmit slots on a first DPCH;
    with respect to the two consecutive transmit slots, decoding a transmit power control command from only one first transmit power control field for two consecutive receive slots on a second DPCH; and
    adapting a gain of the transmitting end device according to the transmit power control command;
    wherein a second transmit power control field transmitted on the second DPCH is a transmit power control field carrying information or data other than the transmit power control command;
    wherein the first and second DPCHs carry radio signals in opposite directions.

6. The power control method of claim 5, further comprising receiving and decoding an information that is not associated with the transmit power command in the second transmit power control field.

7. The power control method of claim 5, wherein only when a connection frame number of the radio frame is even, a first slot of the two consecutive receive slots aligns with a boundary of the radio frame.

8. A power control method performed by a receiving end device, comprising:
    receiving three consecutive receive slots from a first dedicated physical channel (DPCH);
    determining a transmit power control command based on signal qualities of the three consecutive receive slots; and
    transmitting the transmit power control command in only one transmit power control field for three consecutive transmit slots on a second DPCH;
    wherein a second transmit power control field transmitted on the second DPCH is a transmit power control field carrying information or data other than the transmit power control command;
    wherein the first transmit power control field is a transmit power control field firstly available after the transmit power control command is determined;
    and the first and second DPCHs carry radio signals in opposite directions.

9. The power control method of claim 8, wherein a first slot of the three receive consecutive slots aligns with a boundary of the radio frame.

10. The power control method of claim 8, wherein determining step comprises:
    assigning different weights to the signal qualities of the three consecutive receive slots; and
    determining the transmit power control command based on the assigned weights and the signal qualities of the three consecutive receive slots.

11. A power control method performed by a transmitting end device, comprising:
    transmitting three transmit consecutive slots on a first DPCH;
    with respect to the three consecutive transmit slots, decoding a transmit power control command from only one transmit power control field for three consecutive receive slots on a second DPCH; and
    adapting a gain of the transmitting end device according only to the transmit power control command;
    wherein a second transmit power control field transmitted on the second DPCH is a transmit power control field carrying information or data other than the transmit power control command;

wherein the first and second DPCHs carry radio signals in opposite directions.

12. The power control method of claim 11, wherein a first slot of the three consecutive receive slots aligns with a boundary of the radio frame.

13. A power control method performed by a UMTS-FDD system including a transmitting end device and a receiving end device, comprising:
   transmitting, by the transmitting end device, two consecutive transmit slots on a first DPCH;
   receiving, by the receiving end device, the two consecutive transmit slots from the first DPCH;
   determining, by the receiving end device, a transmit power control command based on signal qualities of the two consecutive transmit slots; and
   transmitting, by the receiving end device, the transmit power control command in only one transmit power control field for two consecutive receive slots on a second DPCH;
   wherein a second transmit power control field transmitted on the second DPCH is a transmit power control field carrying information or data other than the transmit power control command;
   wherein the first and second DPCHs carry radio signals in opposite directions.

14. The power control method of claim 13, further comprising:
   decoding, by the transmitting end device, the transmit power control command from the only one transmit power control field for the two consecutive receive slots on the second DPCH; and
   adapting, by the transmitting end device, a gain of the transmitting end device according only to the transmit power control command.

15. The power control method of claim 13, further comprising:
   transmitting, by the receiving end device, an information that is not associated with the transmit power command in the second transmit power control field; and
   receiving, by the transmitting end device, the information that is not associated with the transmit power command in the second transmit power control field.

16. The power control method of claim 13, wherein only when a connection frame number of the radio frame is even, a first slot of the two receive consecutive slots aligns with a boundary of the radio frame.

17. The power control method of claim 13, wherein determining step comprises:
   assigning, by the receiving end device, different weights to the signal qualities of the two transmit consecutive slots; and
   determining, by the receiving end device, the transmit power control command based on the assigned weights and the signal qualities of the two transmit consecutive slots.

* * * * *